US009616887B2

(12) United States Patent
Takagi

(10) Patent No.: US 9,616,887 B2
(45) Date of Patent: Apr. 11, 2017

(54) DRIVING ASSISTANCE DEVICE FOR VEHICLE AND DRIVING ASSISTANCE METHOD FOR VEHICLE

(71) Applicant: NISSAN MOTOR CO., LTD., Yokohama-shi, Kanagawa (JP)

(72) Inventor: Yoshitaka Takagi, Kanagawa (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/905,187

(22) PCT Filed: Jun. 24, 2014

(86) PCT No.: PCT/JP2014/066664
§ 371 (c)(1),
(2) Date: Jan. 14, 2016

(87) PCT Pub. No.: WO2015/008588
PCT Pub. Date: Jan. 22, 2015

(65) Prior Publication Data
US 2016/0176399 A1 Jun. 23, 2016

(30) Foreign Application Priority Data

Jul. 19, 2013 (JP) ................................. 2013-150136

(51) Int. Cl.
G08G 1/16 (2006.01)
B60W 30/08 (2012.01)
(Continued)

(52) U.S. Cl.
CPC ........ B60W 30/0956 (2013.01); B60W 30/16 (2013.01); B60W 30/18154 (2013.01);
(Continued)

(58) Field of Classification Search
CPC ............. B60W 30/0956; B60W 30/16; B60W 30/18154; B60W 2550/30; B60W 2900/00; G08G 1/166
See application file for complete search history.

(56) References Cited

U.S. PATENT DOCUMENTS

| 7,515,056 | B2* | 4/2009 | Knoop | B60Q 9/008 |
| | | | | 180/272 |
| 8,461,976 | B2* | 6/2013 | Yamamoto | B60W 30/0956 |
| | | | | 340/435 |
| 2013/0304365 | A1* | 11/2013 | Trombley | G08G 1/09626 |
| | | | | 701/117 |

FOREIGN PATENT DOCUMENTS

| JP | 2010-039603 A | 2/2010 |
| JP | 2012192878 A | 10/2012 |

* cited by examiner

Primary Examiner — Michael J Zanelli
(74) Attorney, Agent, or Firm — Young Basile Hanlon & MacFarlane, P.C.

(57) ABSTRACT

A driving assistance device for a vehicle includes an object detection section for detecting objects present on the periphery of an own vehicle and determines whether the own vehicle is located within a predetermined region from an intersection. The driving assistance device extracts, from the detected objects, a first moving object which may come into collision with the own vehicle as the own vehicle enters the intersection. The driving assistance device extracts, from the detected objects, a second moving object crossing a road on which the first moving object is traveling between the own vehicle and the first moving object, and acquires motion information of the second moving object crossing the intersection. The driving assistance device determines that the own vehicle can enter the intersection when acquiring the motion information of the second moving object.

11 Claims, 9 Drawing Sheets

(51) Int. Cl.
*B60W 30/095* (2012.01)
*B60W 30/165* (2012.01)
*B60W 30/16* (2012.01)
*B60W 30/18* (2012.01)

(52) U.S. Cl.
CPC ......... *G08G 1/166* (2013.01); *B60W 2550/30* (2013.01); *B60W 2900/00* (2013.01)

FIG. 5
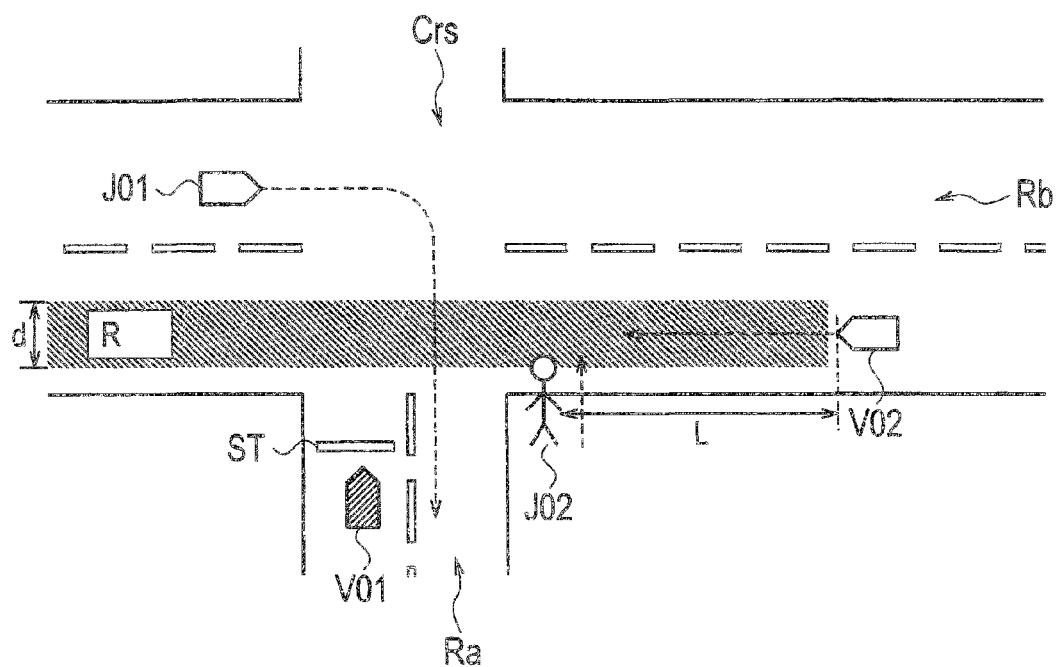
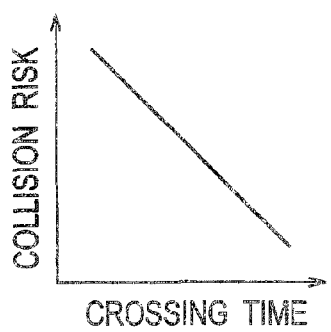
FIG. 6A
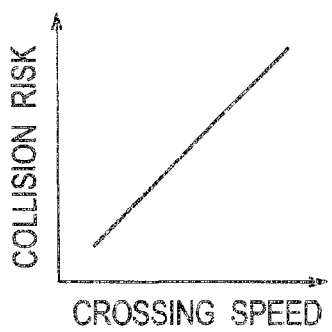
FIG. 6B
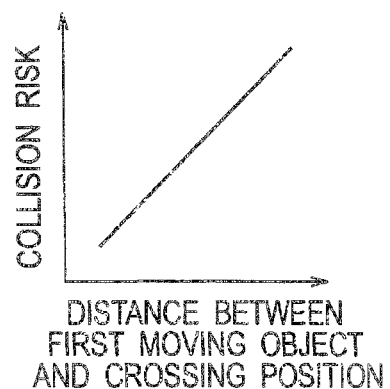
FIG. 6C

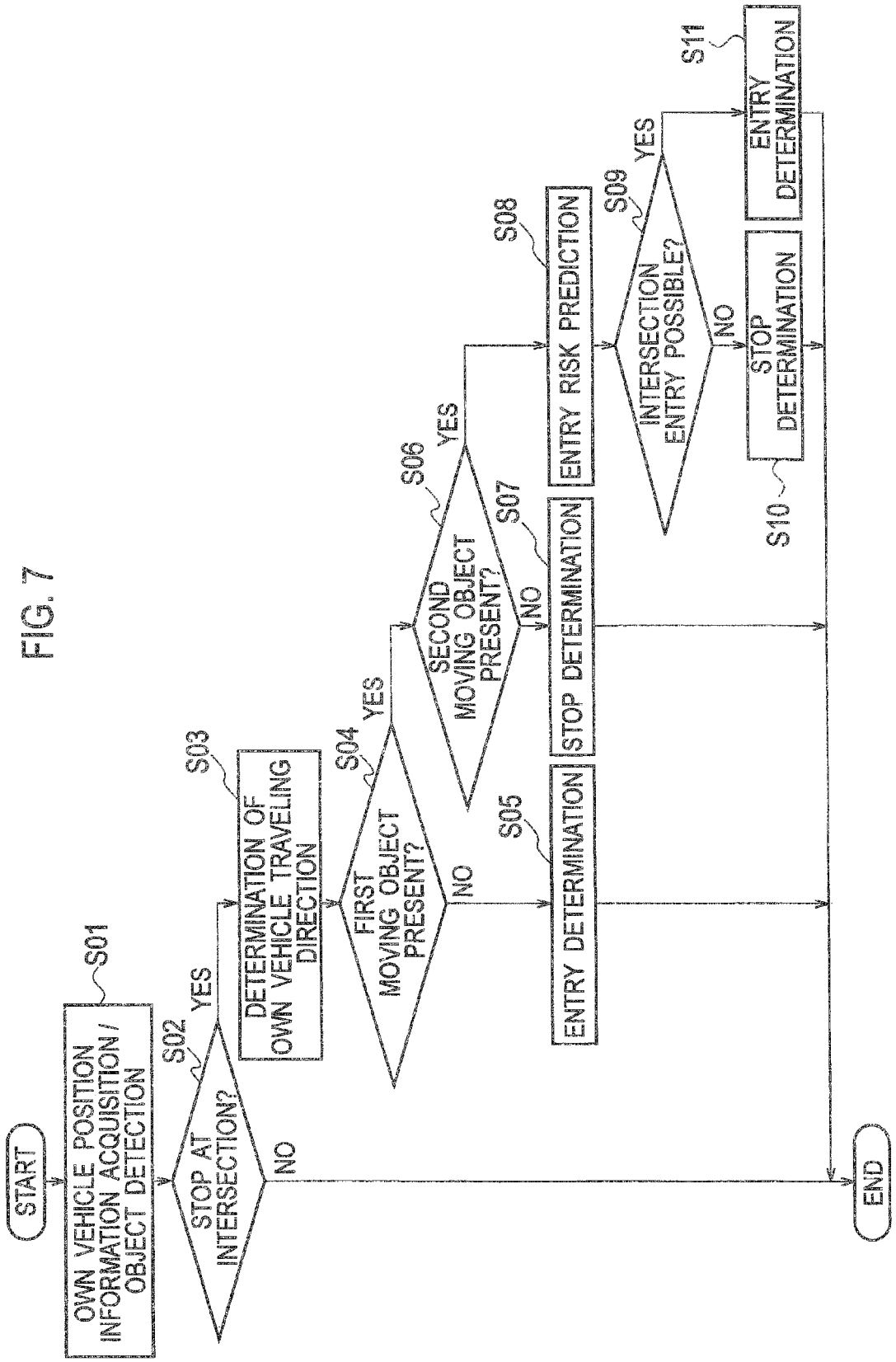

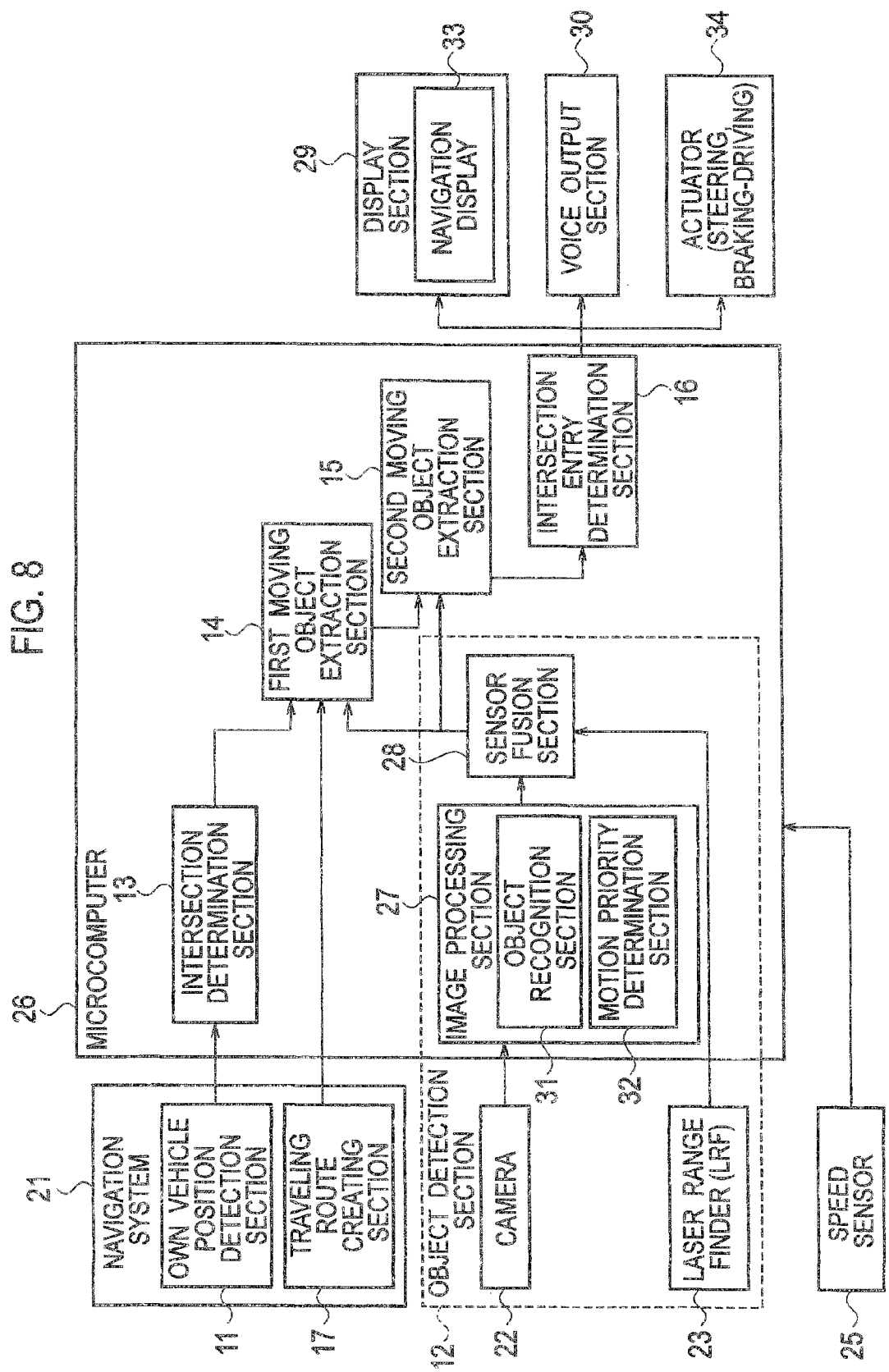

DRIVING ASSISTANCE DEVICE FOR VEHICLE AND DRIVING ASSISTANCE METHOD FOR VEHICLE

CROSS-REFERENCE TO RELATED APPLICATION(S)

This application claims priority to Japanese Patent Application No. P2013-150136 (filed on Jul. 19, 2013), which is herein incorporated by reference.

TECHNICAL FIELD

This disclosure relates to a driving assistance device for a vehicle and a driving assistance method for a vehicle.

BACKGROUND

There is known a safety device for driving that assists in avoiding collision when an own vehicle enters an intersection from a non-priority road (refer to Japanese Patent Unexamined Publication No. 2010-039603). The safety device for driving described in Patent Literature 1 determines whether the own vehicle can enter the intersection based on motion information about a crossing vehicle with which the own vehicle may come into collision when entering the intersection and information about a preceding vehicle traveling in front of the crossing vehicle.

The safety device for driving described in Japanese Patent Unexamined Publication No. 2010-039603 determines whether the own vehicle can enter the intersection based on acceleration information of the crossing vehicle; however, it is difficult to acquire the accurate acceleration information about the crossing vehicle located far from the own vehicle and therefore difficult to determine whether to enter the intersection with high accuracy.

Even if the crossing vehicle is not located far from the own vehicle, the safety device for driving may not be able to acquire the information about the crossing vehicle because the crossing vehicle may enter a blind spot surrounded by other objects as the crossing vehicle advances across the intersection after the crossing vehicle has been detected at a certain point.

SUMMARY

The present invention has been made in view of the above-described conventional problem. An object of the present invention is to provide a driving assistance device for a vehicle and a driving assistance method for a vehicle capable of determining whether an own vehicle can enter an intersection with high reliability.

A driving assistance device for a vehicle according to an aspect of the present invention includes an object detection section for detecting objects present on the periphery of an own vehicle and determines whether the own vehicle is located within a predetermined region from an intersection without traffic light where two or more roads intersect based on a current position of the own vehicle on a map. The driving assistance device for a vehicle extracts, from the objects detected by the object detection section, a first moving object which may come into collision with the own vehicle as the own vehicle enters the intersection when determining that the own vehicle is located within the predetermined position from the intersection.

The driving assistance device for a vehicle extracts, from the objects detected by the object detection section, a second moving object crossing a road on which the first moving object is traveling between the own vehicle and the first moving object when the first moving object is extracted, and acquires motion information of the second moving object crossing the intersection. The driving assistance device for a vehicle determines that the own vehicle can enter the intersection when acquiring the motion information of the second moving object crossing the intersection.

BRIEF DESCRIPTION OF THE DRAWINGS

FIG. 5 is a schematic view for explaining a first example of means for predicting a collision risk by an intersection entry determination section 16;

FIGS. 6A-C are graphs showing a collision risk when a first moving object is traveling on a priority road at an intersection. FIG. 6A is a graph showing a change of the collision risk depending on a length of time for which a second moving object is crossing the road, FIG. 6B is a graph showing a change of the collision risk depending on a speed at which the second moving object is crossing the road, and FIG. 6C is a graph showing a change of the collision risk depending on a distance from the first moving object to a position at which the second moving object is crossing the road;

FIG. 7 is a flowchart showing an example of a driving assistance method for a vehicle using the driving assistance device for a vehicle shown in FIG. 1;

FIG. 8 is a block diagram showing a configuration of a driving assistance device for a vehicle according to a second embodiment;

FIG. 10A is graph showing a change of the collision risk depending on a length of time for which a second moving object is crossing the road.

DESCRIPTION OF THE EMBODIMENTS (First Embodiment)

Figure 1:
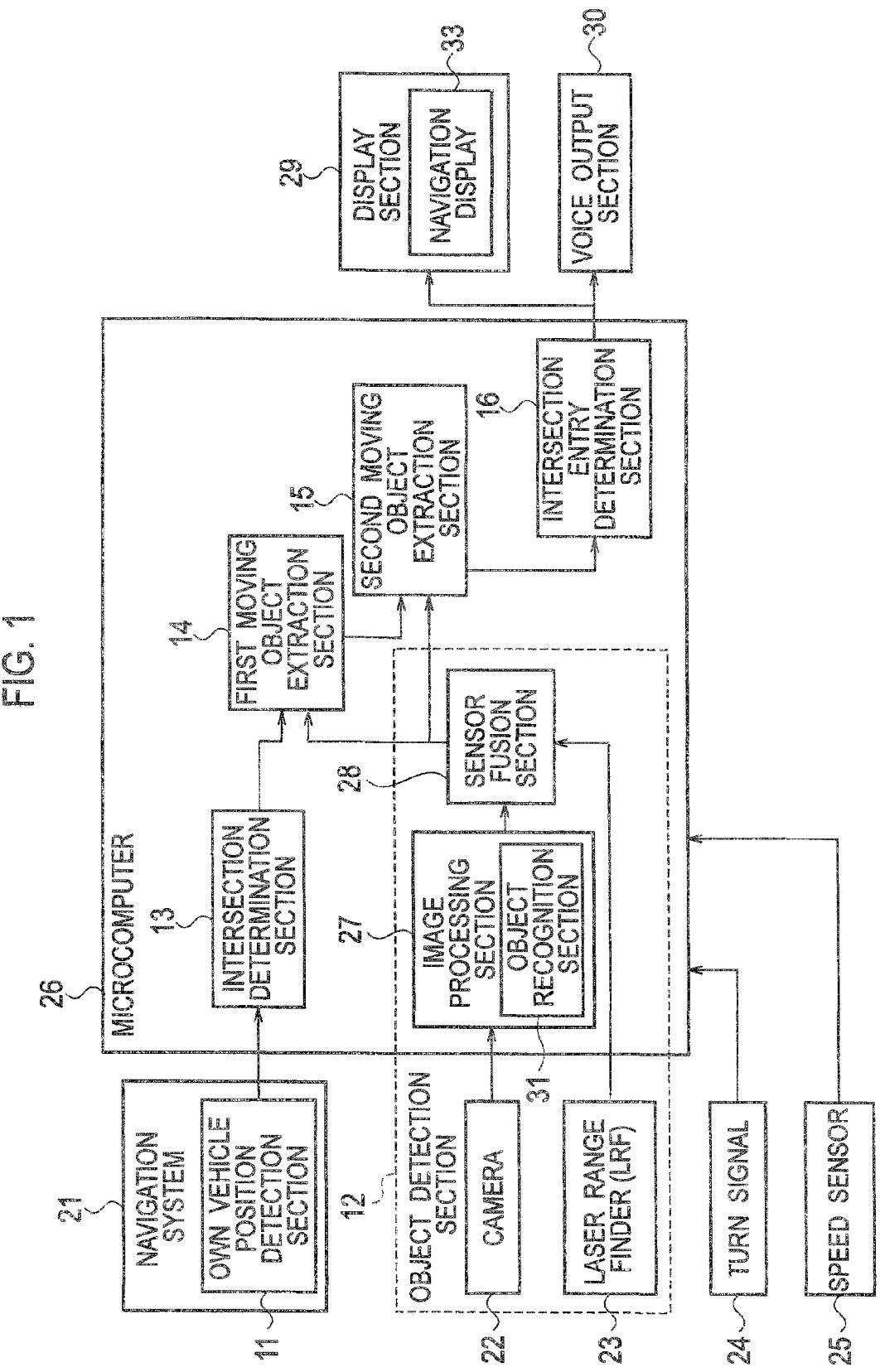
FIG. 1 is a block diagram showing a configuration of a driving assistance device for a vehicle according to a first embodiment.

Hereinafter, embodiments according to the present invention will be explained with reference to the drawings. A configuration of a driving assistance device for a vehicle according to a first embodiment of the present invention is explained below with reference to FIG. 1. The driving assistance device for a vehicle according to the first embodiment of the present invention is assumed to be used for a vehicle (own vehicle) driven by the operation of a driver.

The own vehicle is equipped with a navigation system 21 by use of a global positioning system (GPS) to acquire position information of the own vehicle, a camera 22 for imaging a peripheral region extending in the horizontal direction including the front side of the own vehicle, a laser range finder (LRF) 23 for detecting objects present in the peripheral region extending in the horizontal direction including the front side of the own vehicle, a turn signal 24 operated by the driver to indicate a direction in which the own vehicle turns at an intersection, speed sensors 25 for detecting a speed of the own vehicle, a microcomputer 26 serving as a determination section to determine whether the own vehicle can enter the intersection, a display section 29 for notifying the driver of the determination result of the microcomputer 26 as visual information, and a voice output section 30 for notifying the driver of the determination result of the microcomputer 26 as auditory information.

Figure 2:
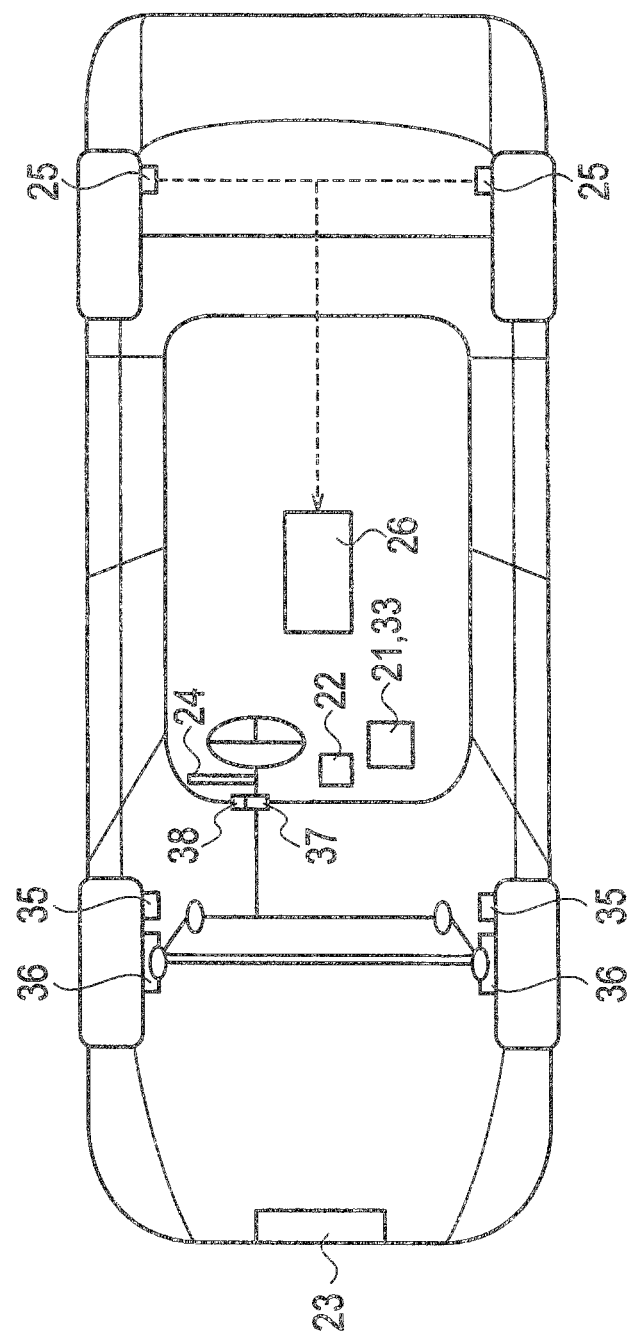
FIG. 2 is a plan view showing an example of installation of the driving assistance device for a vehicle shown in FIG. 1.

An example of arrangement of the constituent elements shown in FIG. 1 installed in the own vehicle is explained with reference to FIG. 2. The laser range finder 23 for detecting objects present in the peripheral region including the front side of the own vehicle is installed adjacent to a front bumper. The speed sensors 25 are located adjacent to two rear wheels (traveling wheels) of the own vehicle. The microcomputer 26 and the camera 22 are installed in the interior of the own vehicle. The navigation system 21 and a navigation display 33 are installed in an instrument panel in the interior of the own vehicle. The camera 22 images the peripheral region including the front side of the own vehicle. The speed sensors 25 count the number of rotation of the traveling wheels and multiply the number of rotation by a predetermined wheel circumferential length so as to obtain the speed of the own vehicle. The turn signal 24 is provided in a steering column. Although FIG. 2 is illustrated with an example where the constituent elements shown in FIG. 1 are installed in an electric vehicle (own vehicle) using an electric motor 36 as a driving power source, the constituent elements shown in FIG. 1 may be installed in a vehicle using an engine as a driving power source.

Returning to FIG. 1, the driving assistance device for a vehicle according to the first embodiment includes an own vehicle position detection section 11, an object detection section 12, an intersection determination section 13, a first moving object extraction section 14, a second moving object extraction section 15, and an intersection entry determination section 16. The own vehicle position detection section 11 detects a current position of the own vehicle on a map. The object detection section 12 detects objects present on the periphery of the own vehicle. The intersection determination section 13 determines whether the own vehicle is located within a predetermined region from an intersection without traffic light where two or more roads intersect, based on the current position detected by the own vehicle position detection section 11. The first moving object extraction section 14 extracts, from the objects detected by the object detection section 12, a first moving object which may come into collision with the own vehicle as the own vehicle enters the intersection when the intersection determination section 13 determines that the own vehicle is located within the predetermined region from the intersection. The second moving object extraction section 15 extracts, from the objects detected by the object detection section 12, a second moving object which is crossing a road on which the first moving object is traveling between the own vehicle and the first moving object when the first moving object is extracted by the first moving object extraction section 14. The second moving object extraction section 15 acquires motion information of the second moving object crossing the intersection. The intersection entry determination section 16 determines that the own vehicle can enter the intersection when the second moving object extraction section 15 acquires the motion information of the second moving object crossing the intersection.

The operation of the own vehicle position detection section 11 is implemented by the navigation system 21. The object detection section 12 includes the camera 22, an image processing section 27 that processes images obtained by the camera 22, the laser range finder (LRF) 23, and a sensor fusion section 28 that merges the processing result obtained by the image processing section 27 and the detection result obtained by the laser range finder (LRF) 23.

The image processing section 27 includes an object recognition section 31 that performs edge detection processing on the images obtained by the camera 22 to detect objects including three-dimensional objects in the images. Note that an object detection range of the laser range finder (LRF) 23 does not necessarily conform to an imaging range of the camera 22. The sensor fusion section 28 labels the objects detected by the laser range finder (LRF) 23 based on the object recognition result obtained by use of the camera 22. The sensor fusion section 28 further performs sensor fusion processing on the labeled objects so as to track the objects by use of the laser range finder (LRF) 23 in case the labeled objects come out of the imaging range of the camera 22.

The image processing section 27, the sensor fusion section 28, the intersection determination section 13, the first moving object extraction section 14, the second moving object extraction section 15 and the intersection entry determination section 16 described above compose the functions of the microcomputer 26 mounted on the vehicle implemented in such a manner as to execute computer programs preliminarily installed in the microcomputer 26. The computer programs include a program for operating the microcomputer 26 as a controller for the display section 29 and the voice output section 30.

Figure 12:
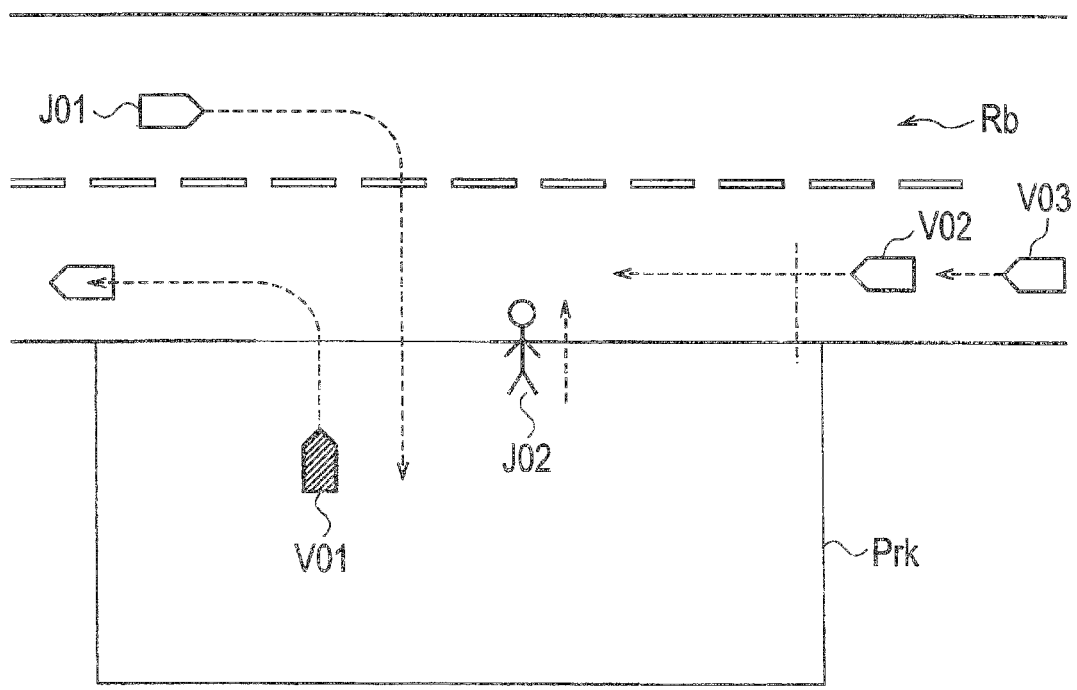
FIG. 12 is a schematic view showing an entrance of a parking Prk by the side of a road Rb.

As an example of how to determine whether the own vehicle is located within the predetermined region from the intersection, the intersection determination section 13 determines whether the own vehicle reaches the intersection as a target for entry determination within a predetermined period of time based on map information acquired by the navigation system 21, the current position of the own vehicle and the speed of the own vehicle. Alternatively, the intersection determination section 13 may determine whether a distance from the current position of the own vehicle to the intersection as a target for entry determination is a predetermined distance or less. Here, the intersection as a target for entry determination is assumed to be a point where plural roads intersect but no traffic control is directed by outside infrastructure, such as an intersection where two or more roads intersect including a junction of three roads, a junction of four roads and a junction of plural roads, without traffic light. In addition, as shown in FIG. 12, an entrance of a parking Prk by the side of a road Rb is also considered as a point where plural roads intersect and is targeted for entry determination. The presence or absence of a traffic light can be detected by the image processing section 27, and a priority road and a non-priority road at the intersection can be extracted in such a manner as to recognize road pains or signposts. In the present embodiment, the intersection determination section 13 acquires the map information from the navigation system 21 and determines the presence or absence of the traffic light and the priority or non-priority road at the intersection accordingly.

Figure 3:
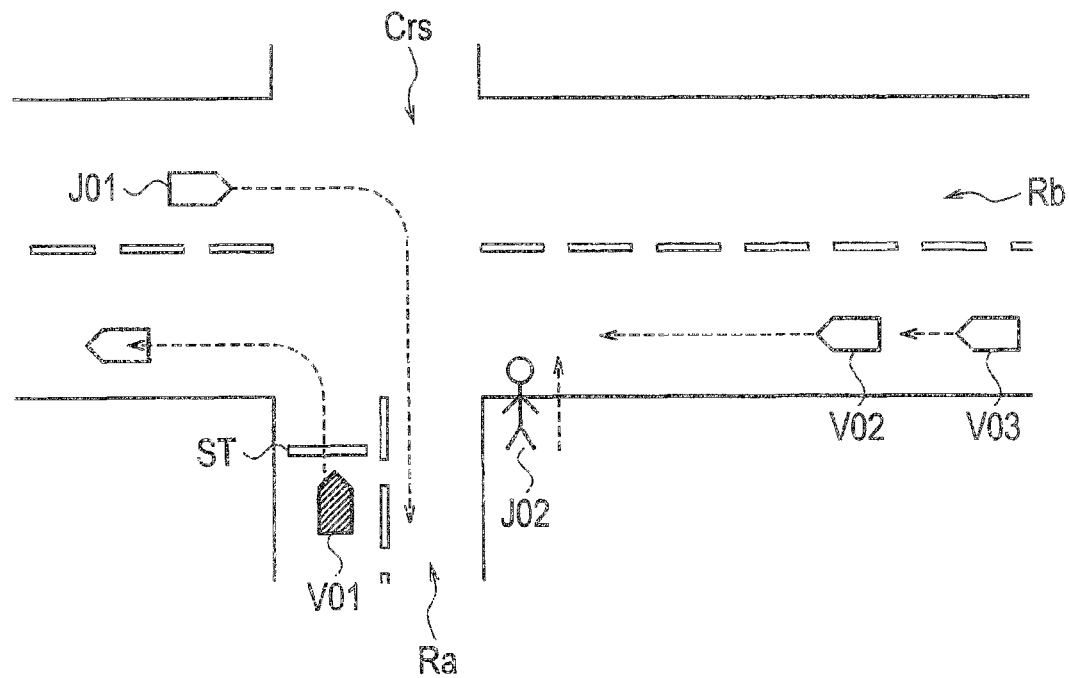
FIG. 3 is a schematic view for explaining a method for extracting a first moving object and a second moving object.

The first moving object extraction section 14 extracts a first moving object depending on the traveling direction of the own vehicle at the intersection. First of all, the first moving object extraction section 14 determines the direction in which the own vehicle is traveling. In the present embodiment, the first moving object extraction section 14 determines the traveling direction of the own vehicle at the intersection based on a signal of directional indication operated by the driver of the own vehicle. For example, as shown in FIG. 3, the first moving object extraction section 14 determines a traveling direction of the own vehicle V01 at an intersection Crs depending on a state of the turn signal 24 when the own vehicle V01 is stopping at a stop line ST before the intersection Crs. When the driver operates the turn signal 24 to indicate the left, the first moving object extraction section 14 determines that the traveling direction of the own vehicle V01 is the left. When the turn signal 24 has not been operated for a predetermined period of time before and after the own vehicle V01 stops at the stop line ST, the first moving object extraction section 14 determines that the own vehicle V01 is traveling straight.

When determining that the own vehicle is turning to the left, the first moving object extraction section 14 extracts, as a first moving object, a moving object coming closer to the intersection Crs from the right on a priority road Rb intersecting a non-priority road Ra on which the own vehicle is traveling. When determining that the own vehicle is traveling straight, the first moving object extraction section 14 extracts, as a first moving object, a moving object coming closer to the intersection Crs from the right or the left on the road Rb. When determining that the own vehicle is turning to the right, the first moving object extraction section 14 extracts, as a first moving object, a moving object coming closer to the intersection Crs from the right or the left on the road Rb or coming closer to the intersection Crs from the opposite side of the road Ra.

When plural moving objects come closer to the intersection Crs in the same direction on the road Ra or the road Rb, such as moving objects V02 and V03 shown in FIG. 3, the first moving object extraction section 14 extracts the respective moving objects V02 and V03 as a first moving object as long as the plural moving objects are each detected as an object by the laser range finder (LRF) 23.

When the first moving object extraction section 14 extracts the plural first moving objects (such as V02 and V03), the second moving object extraction section 15 extracts a second moving object with respect to each of the first moving objects V02 and V03. The second moving object extraction section 15 may extract plural second moving objects with respect to one first moving object.

Next, "the second moving object crossing the road on which the first moving object is traveling between the own vehicle and the first moving object" extracted by the second moving object extraction section 15 is explained in detail below with reference to FIG. 3 and FIG. 4.

The first moving object V02 shown in FIG. 3 is assumed to travel straight across the intersection Crs. The object detection section 12 has detected an object (vehicle J01) coming closer to the intersection Crs on the opposite side of the first moving object V02 and intending to turn to the right at the intersection Crs. In addition, the object detection section 12 has detected an object (pedestrian J02) crossing, between the first moving object V02 and the intersection Crs, the road Rb on which the first moving object V02 is traveling. In this case, the second moving object extraction section 15 extracts each of the vehicle J01 and the pedestrian J02 as a second moving object crossing the road on which the first moving object V02 is traveling between the own vehicle V01 and the first moving object V02. Here, the intention that the vehicle J01 is turning to the right may be determined in a manner such that the image processing section 27 analyzes a state of a turn signal of the vehicle J01 or deceleration of the vehicle J01.

Figure 4:
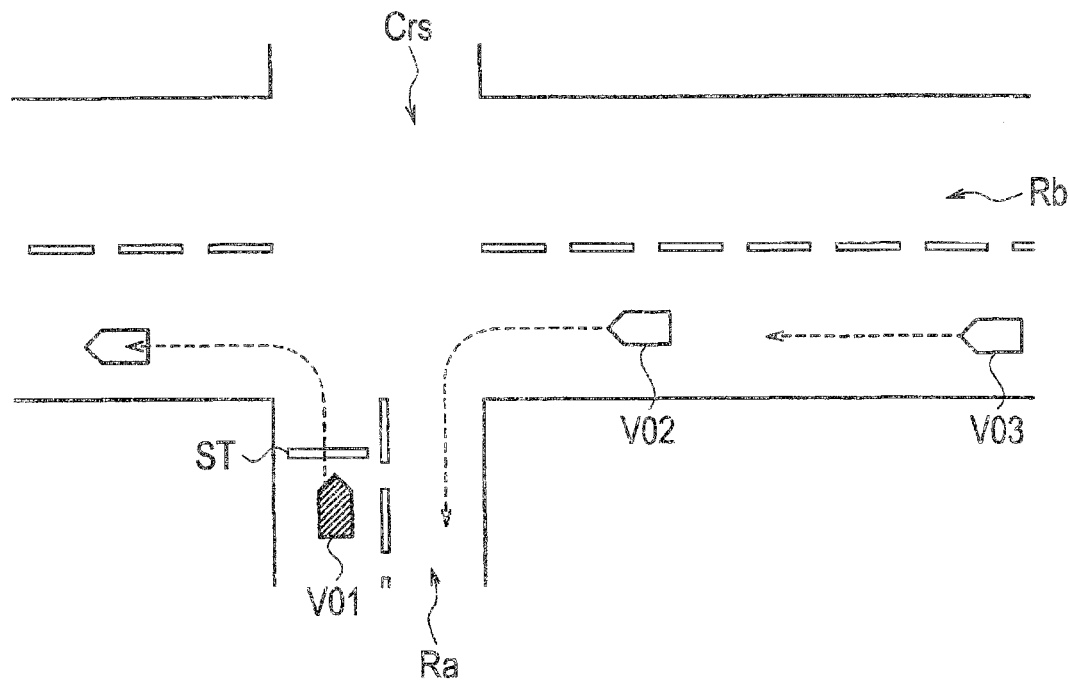
FIG. 4 is a schematic view for explaining a method for extracting a second moving object.

The first moving object V03 shown in FIG. 4, which is extracted by the first moving object extraction section 14 as a first moving object, is assumed to travel straight across the intersection Crs. The object detection section 12 has detected an object (vehicle V02) reaching the intersection Crs before the first moving object V03 in the same direction as the first moving object V03 and intending to turn to the left at the intersection Crs. In this case, the second moving object extraction section 15 extracts the vehicle V02 as a second moving object crossing the road on which the first moving object V03 is traveling between the own vehicle V01 and the first moving object V03. The second moving object extraction section 15 then acquires motion information of the second moving object crossing the intersection. Examples of the motion information of the second moving object crossing the intersection include a length of time for which the second moving object is crossing the road on which the first moving object is traveling between the own vehicle and the first moving object, a speed at which the second moving object is crossing, and a distance between the first moving object and a position at which the second moving object is crossing the road on which the first moving object is traveling. The motion information of the second moving object crossing the intersection can be acquired by image analysis by the image processing section 27 or acquired by the navigation system 21.

The intersection entry determination section 16 predicts a collision risk of the own vehicle with the first moving object based on the motion information of the second moving object crossing the intersection so as to determine whether the own vehicle can enter the intersection based on the predicted collision risk. The second moving object is located closer to the first moving object than the own vehicle and crossing the road on which the first moving object is traveling. Therefore, the second moving object is taking action to cross the road while taking account of the presence of the first moving object. Accordingly, the motion information of the second moving object crossing the intersection can be used with high reliability for determining the possibility of collision with the first moving object.

As a first method, the intersection entry determination section 16 determines whether to enter the intersection depending on the length of time for which the second moving object is crossing the road on which the first moving object is traveling between the own vehicle and the first moving object or depending on the speed at which the second moving object is crossing.

In particular, in the case where the detected first moving object is traveling at the intersection on the priority road, the intersection entry determination section 16 predicts that the risk of collision with the first moving object is lower as the length of time for which the second moving object is crossing the road on which the first moving object is traveling between the own vehicle and the first moving object is longer or as the speed at which the second moving object is crossing is less, as shown in FIG. 6A and FIG. 6B. When the predicted collision risk is less than a predetermined threshold, the intersection entry determination section 16 determines that the own vehicle can enter the intersection. When the predicted collision risk is the predetermined threshold or greater, the intersection entry determination section 16 determines that the own vehicle should not enter the intersection.

For example, as shown in FIG. 5, the intersection entry determination section 16 determines whether to enter the intersection depending on the time required for the passage of the second moving objects (J01, J02) across a lane R having a width d on which the first moving object V02 is traveling (passage time), or depending on the speed at which the second moving objects (J01, J02) are passing across the lane R having the width d (passage speed). As the passage time is longer or the passage speed is less, the second moving objects (J01, J02) are assumed to be passing across the lane R while determining that the possibility of collision with the first moving object V02 is lower. Accordingly, the risk of collision with the own vehicle V01 located farther than the second moving objects (J01, J02) from the first moving object V02 can also be estimated to be low.

Figure 10A:
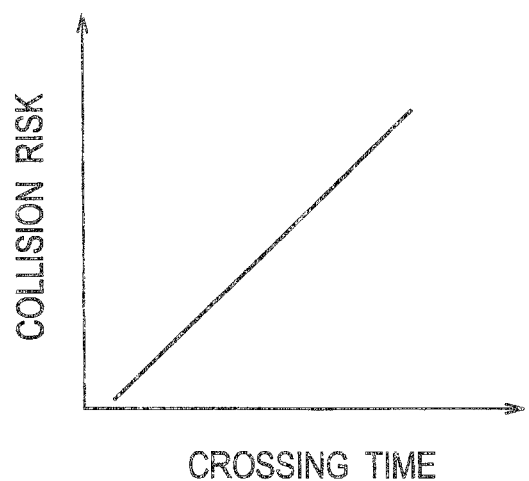
FIGS. 10A and B are graphs showing a collision risk when a first moving object is traveling on a non-priority road at an intersection.
Figure 10B:
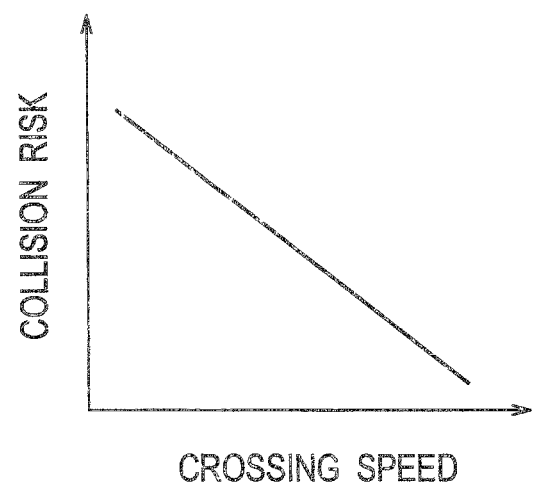
FIG. 10B is a graph showing a change of the collision risk depending on a speed at which the second moving object is crossing the road.

In the case where the detected first moving object is traveling at the intersection on the non-priority road, the intersection entry determination section 16 predicts that the risk of collision with the first moving object is lower as the length of time for which the second moving object is crossing the road on which the first moving object is traveling between the own vehicle and the first moving object is shorter or as the speed at which the second moving object is crossing is greater, as shown in FIG. 10A and FIG. 10B.

Figure 11:
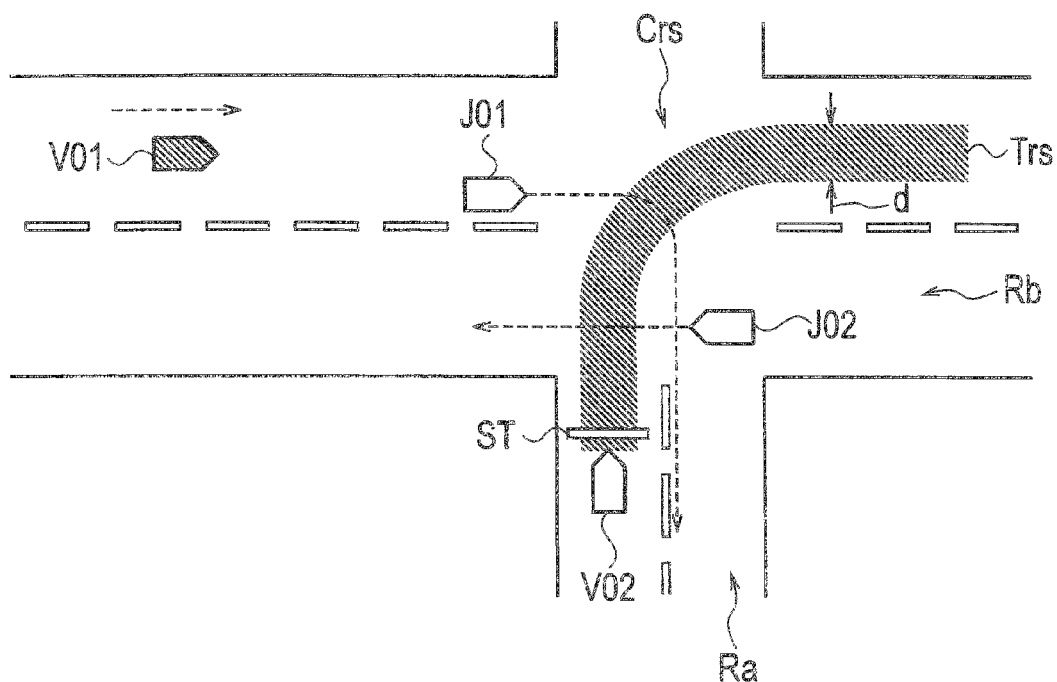
FIG. 11 is a schematic view for explaining an example of means for predicting the collision risk when the first moving object is traveling on the non-priority road at the intersection.

For example, as shown in FIG. 11, the own vehicle V01 is moving toward the intersection Crs on the priority road Rb. The first moving object extraction section 14 extracts, as a first moving object, the vehicle V02 entering the intersection Crs on the non-priority road Ra and intending to turn to the right at the intersection Crs. The vehicle J01 is reaching the intersection Crs before the own vehicle V01 in the same direction as the own vehicle V01 and intending to turn to the right at the intersection Crs. The vehicle J02 is reaching the intersection Crs before the own vehicle V01 on the opposite side of the own vehicle V01 and traveling straight across the intersection Crs. The second moving object extraction section 15 extracts each of the vehicle J01 and the vehicle J02 as a second moving object crossing, between the own vehicle V01 and the first moving object V02, a traveling route Trs on which the first moving object V02 is traveling.

The intersection entry determination section 16 determines whether to enter the intersection depending on the time required for the passage of the second moving objects (J01, J02) across the traveling route Trs having a width d on which the first moving object V02 is traveling (passage time), or depending on the speed at which the second moving objects (J01, J02) are passing across the traveling route Trs having the width d (passage speed). As the passage time is shorter or the passage speed is greater, the second moving objects (J01, J02) are assumed to be passing across the traveling route Trs while determining that the first moving object V02 on the non-priority road does not enter the intersection so that the possibility of collision with the first moving object V02 is lower. Accordingly, the risk of collision with the own vehicle V01 located farther than the second moving objects (J01, J02) from the first moving object V02 can also be estimated to be low.

As a second method, the intersection entry determination section 16 determines whether to enter the intersection depending on the distance between the first moving object and a position at which the second moving object is crossing the road on which the first moving object is traveling.

In particular, as shown in FIG. 5, as the position where the second moving object J02 is crossing the road Rb on which the first moving object V02 is traveling is closer to the first moving object V02, that is, as a distance L between the first moving object V02 and the position where the second moving object J02 is crossing the road Rb on which the first moving object V02 is traveling is shorter, a length of time for which the own vehicle V01 is waiting to enter the intersection Crs is longer so that the own vehicle V01 has sufficient time to enter the intersection Crs. Accordingly, as shown in FIG. 6C, the intersection entry determination section 16 predicts that the risk of collision with the first moving object V02 is lower as the distance L is shorter.

The intersection entry determination section 16 may predict the collision risk by either the first method or the second method, or predict the collision risk by the combination of the first method and the second method. For example, the collision risk may be predicted in such a manner as to multiply the collision risk (f1) obtained by the first method and the collision risk (f2) obtained by the second method by weighting coefficients ($\alpha 1/\alpha 1+\alpha 2$, $\alpha 2/\alpha 1+\alpha 2$) so as to obtain the average thereof.

Note that, when the first moving object extraction section 14 extracts a plurality of first moving objects, or when the second moving object extraction section 15 extracts a plurality of second moving objects with respect to one first moving object, the intersection entry determination section 16 determines whether the own vehicle can enter the intersection based on the highest collision risk. The intersection entry determination section 16 determines that the own vehicle can enter the intersection when the highest collision risk is less than a predetermined threshold, and the intersection entry determination section 16 determines that the own vehicle should not enter the intersection when the highest collision risk is the predetermined threshold or greater. As a result, a determination with a high degree of safety can be made.

Next, an example of a driving assistance method for a vehicle using the driving assistance device for a vehicle shown in FIG. 1 is explained below with reference to FIG. 7. The process shown in the flowchart of FIG. 7 is repeated per predetermined sampling cycle.

In step S01, the own vehicle position detection section 11 detects a current position of the own vehicle on a map by use of the navigation system 21. The object detection section 12 detects objects present on the periphery of the own vehicle by use of the camera 22 and the laser range finder (LRF) 23.

Proceeding to step S02, the intersection determination section 13 determines, based on the current position on the map and map data, whether the own vehicle is located within a predetermined region from an intersection without traffic light where two or more roads intersect. The process proceeds to step S03 when the own vehicle is stopping (YES in S02), or the process in the flowchart of FIG. 7 ends when the own vehicle does not stop (NO in S02).

In step S03, the first moving object extraction section 14 determines the traveling direction of the own vehicle at the intersection according to the operation of the turn signal 24 by the driver. In particular, the first moving object extraction section 14 determines whether to turn to the left, turn to the right or go straight ahead when the intersection is a junction of four roads. Proceeding to step S04, the first moving object extraction section 14 extracts the first moving object from the objects detected in step S01 according to the traveling direction of the own vehicle. Simultaneously with this extraction, the first moving object extraction section 14 refers to the detection result and the map data and labels the first moving object to indicate which road the first moving object belongs on, a priority road or a non-priority road. The process proceeds to step S06 when the first moving object is present (YES in S04), or the intersection entry determination section 16 determines that the own vehicle can enter the intersection when the first moving object is not present (NO in S04), and the process proceeds to step S05.

In step S05, the display section 29 displays, on the navigation display 33, visual information to notify the driver that the own vehicle can enter the intersection in accordance with the control by the microcomputer 26. The voice output section 30 outputs auditory information to notify the driver that the own vehicle can enter the intersection in accordance with the control by the microcomputer 26.

In step S06, the second moving object extraction section 15 extracts the second moving object from the objects detected in step S01. When the second moving object is present (YES in S06), the second moving object extraction section 15 acquires motion information of the second moving object crossing the intersection, and the process proceeds to step S08. When the second moving object is not detected (NO in S06) but the first moving object with which the own vehicle may come into collision is still detected, the intersection entry determination section 16 determines that the own vehicle should stop at the intersection, although the second moving object is not extracted, because the obstacle has been detected with which the own vehicle may come into collision if the own vehicle enters the intersection, and the process proceeds to step S07.

In step S07, the display section 29 displays, on the navigation display 33, virtual information to notify the driver that "the own vehicle should stop at the intersection because the obstacle has been detected with which the own vehicle may come into collision" in accordance with the control by the microcomputer 26. The voice output section 30 outputs auditory information to notify the driver that "the own vehicle should stop at the intersection because the obstacle has been detected with which the own vehicle may come into collision" in accordance with the control by the microcomputer 26.

In step S08, the intersection entry determination section 16 predicts a risk of collision with the first moving object based on the motion information of the second moving object crossing the intersection. The motion information of the second moving object crossing the intersection includes the above-described passage time, passage speed and distance between the first moving object and the second moving object.

Proceeding to step S09, the intersection entry determination section 16 determines whether the own vehicle can enter the intersection based on the predicted collision risk. When the predicted collision risk is less than a predetermined threshold (YES in S09), the intersection entry determination section 16 determines that the own vehicle can enter the intersection, and the process proceeds to step S11. When the predicted collision risk is the predetermined threshold or greater (NO in S09), the intersection entry determination section 16 determines that the own vehicle should not enter the intersection, and the process proceeds to step S10.

In step S10, the virtual information and the auditory information are output to notify the driver that "the own vehicle should stop at the intersection because the obstacle has been detected with which the own vehicle may come into collision", as in the case of step S07.

In step S11, the virtual information and the auditory information are output to notify the driver that the own vehicle can enter the intersection, as in the case of step S05.

Here, the notification of the information output every time the determination that the own vehicle can enter the intersection is made in step S05 and step S11 may annoy the driver. Thus, the notification is not necessarily output when the own vehicle enters the intersection after the determination that the own vehicle can enter the intersection is made in step S05 and step S11. When the own vehicle enters the intersection after the determination that the own vehicle should stop at the intersection is made in step S07 and step S10, a warning sound or a voice notification may be output in confirmation of the determination.

As described above, the first embodiment of the present invention can ensure the following working effects.

When the intersection entry determination section 16 acquires the motion information of the second moving object crossing the intersection, the intersection entry determination section 16 determines that own vehicle can enter the intersection. The second moving object extracted by the second moving object extraction section 15 is located closer to the first moving object than the own vehicle and is crossing the road on which the first moving object is traveling. Therefore, the second moving object is taking action to cross the road while taking account of the presence of the first moving object. Thus, the motion information of the second moving object crossing the intersection can be used with high reliability for the determination of possibility of collision with the first moving object. Accordingly, the intersection entry determination section 16 can determine whether to enter the intersection with high reliability without use of acceleration information of objects.

When the first moving object is located on the priority road, the intersection entry determination section 16 predicts that the risk of collision with the first moving object is lower as the length of time for which the second moving object is crossing the road on which the first moving object is traveling between the own vehicle and the first moving object is longer or as the speed at which the second moving object is crossing is less. As the length of time for which the second moving object is crossing the road on which the first moving object is traveling between the own vehicle and the first moving object is longer or as the speed at which the second moving object is crossing is less, the second moving object can be assumed to be taking action while determining that the possibility of collision with the first moving object is lower. When the first moving object is located on the non-priority road, the intersection entry determination section 16 predicts that the risk of collision with the first moving object is lower as the length of time for which the second moving object is crossing the road on which the first moving object is traveling between the own vehicle and the first moving object is shorter or as the speed at which the second moving object is crossing is greater. As the length of time for which the second moving object is crossing the road on which the first moving object is traveling between the own vehicle and the first moving object is shorter or as the speed at which the second moving object is crossing is greater, the second moving object can be assumed to be taking action while determining that the possibility of collision with the first moving object is lower. Therefore, the risk of collision with the own vehicle located farther than the second moving object from the first moving object can also be estimated to be low. Accordingly, the collision risk can be predicted with high accuracy.

As the position at which the second moving object is crossing the road on which the first moving object is traveling between the own vehicle and the first moving object is closer to the first moving object, the length of time for which the own vehicle V01 is waiting to enter the intersection is longer so that the own vehicle has sufficient time to enter the intersection. Therefore, the risk of collision with the own vehicle can also be estimated to be low. Accordingly, the collision risk can be predicted with high accuracy.

In the case where the first moving object extraction section 14 extracts a plurality of first moving objects or the second moving object extraction section 15 extracts a plurality of second moving objects with respect to one first moving object, the intersection entry determination section 16 determines that the own vehicle can enter the intersection when the highest collision risk is less than a predetermined threshold. Accordingly, a safety determination can be made.

The first moving object extraction section 14 extracts the first moving object based on the traveling direction of the own vehicle at the intersection. Accordingly, an accurate object extraction can be made according to the traveling direction of the own vehicle.

The first moving object extraction section 14 determines the traveling direction of the own vehicle at the intersection based on a signal of directional indication operated by the driver of the own vehicle. Accordingly, the traveling direction of the own vehicle can be determined accurately.

(Second Embodiment)

A configuration of a driving assistance device for a vehicle according to a second embodiment of the present invention is explained below with reference to FIG. 8. The driving assistance device for a vehicle according to the second embodiment of the present invention is assumed to be used for a vehicle (own vehicle) in which an override operated by a driver is activated constantly and autonomous driving by each actuator control is possible.

The driving assistance device for a vehicle according to the second embodiment differs from the driving assistance device for a vehicle according to the first embodiment shown in FIG. 1 in the following points. As shown in FIG. 8, the driving assistance device for a vehicle according to the second embodiment further includes a traveling route creating section 17 that creates a traveling route of the own vehicle from a current position of the own vehicle on a map detected by the own vehicle position detection section 11 to a destination, and an actuator 34 serving as a vehicle controlling section to perform follow-up control based on the traveling route created by the traveling route creating section 17. The object detection section 12 further includes a motion priority determination section 32 for determining motion priority of objects detected.

The operation of the traveling route creating section 17 is implemented by the navigation system 21. The first moving object extraction section 14 determines a traveling direction of the own vehicle at an intersection based on the traveling route created by the traveling rout creating section 17. The actuator 34 controls steering and braking-driving operations of the own vehicle depending on a determination result of the intersection entry determination section 16 in accordance with the control by the microcomputer 26.

The motion priority determination section 32 composes part of the image processing section 27 for analyzing images obtained by the camera 22 in the object detection section 12. In particular, the motion priority determination section 32 determines an attribute of an object recognized by the object recognition section 31 to determine the motion priority of the object according to the determined attribute. For example, the motion priority determination section 32 determines which category the object belongs to, a vehicle, a bicycle or a pedestrian, depending on motion characteristics or size of the object. The motion priority determination section 32 preliminarily stores motion priority per category under traffic rules, and determines the motion priority of the object with reference to the motion priority per category. For example, a bicycle has priority over a vehicle, and a pedestrian has priority over the bicycle.

In the first embodiment, when the second moving object extraction section 15 extracts a plurality of second moving objects with respect to one first moving object, the intersection entry determination section 16 determines whether the own vehicle can enter the intersection based on the highest collision risk among collision risks of the plural second moving objects, as described above. In the second embodiment, the intersection entry determination section 16 determines whether the own vehicle can enter the intersection based on the motion information of the second moving object crossing the intersection and having the highest motion priority among the plural second moving objects determined by the motion priority determination section 32. Thus, the determination of which second moving object has the highest motion priority is used preferentially. In particular, the intersection entry determination section 16 calculates the collision risk according to the motion information of the second moving object crossing the intersection and having the highest motion priority. The intersection entry determination section 16 determines that the own vehicle can enter the intersection when the calculated collision risk is less than a predetermined threshold, and determines that the own vehicle should not enter the intersection when the calculated collision risk is the predetermined threshold or greater.

An example of arrangement of the constituent elements shown in FIG. 8 installed in the own vehicle is explained with reference to FIG. 2. The example of arrangement in the own vehicle in the second embodiment differs from that in the first embodiment in the following points. The steering column is provided with an electric power steering (EPS) motor 37 and a steering angle sensor 38 used for steering angle control. The actuator for controlling the braking-driving force controls, based on speed information of the speed sensors 25, brakes (including a friction brake and a regenerative brake) provided at the front wheels (driving wheels) of the own vehicle and an electric motor 36. The EPS motor 37 controls the steering angle of the driving wheels based on a detection result of the steering angle sensor 38. The EPS motor 37 and the actuator for controlling the braking-driving force described above are included in the actuator 34 shown in FIG. 8.

Figure 9:
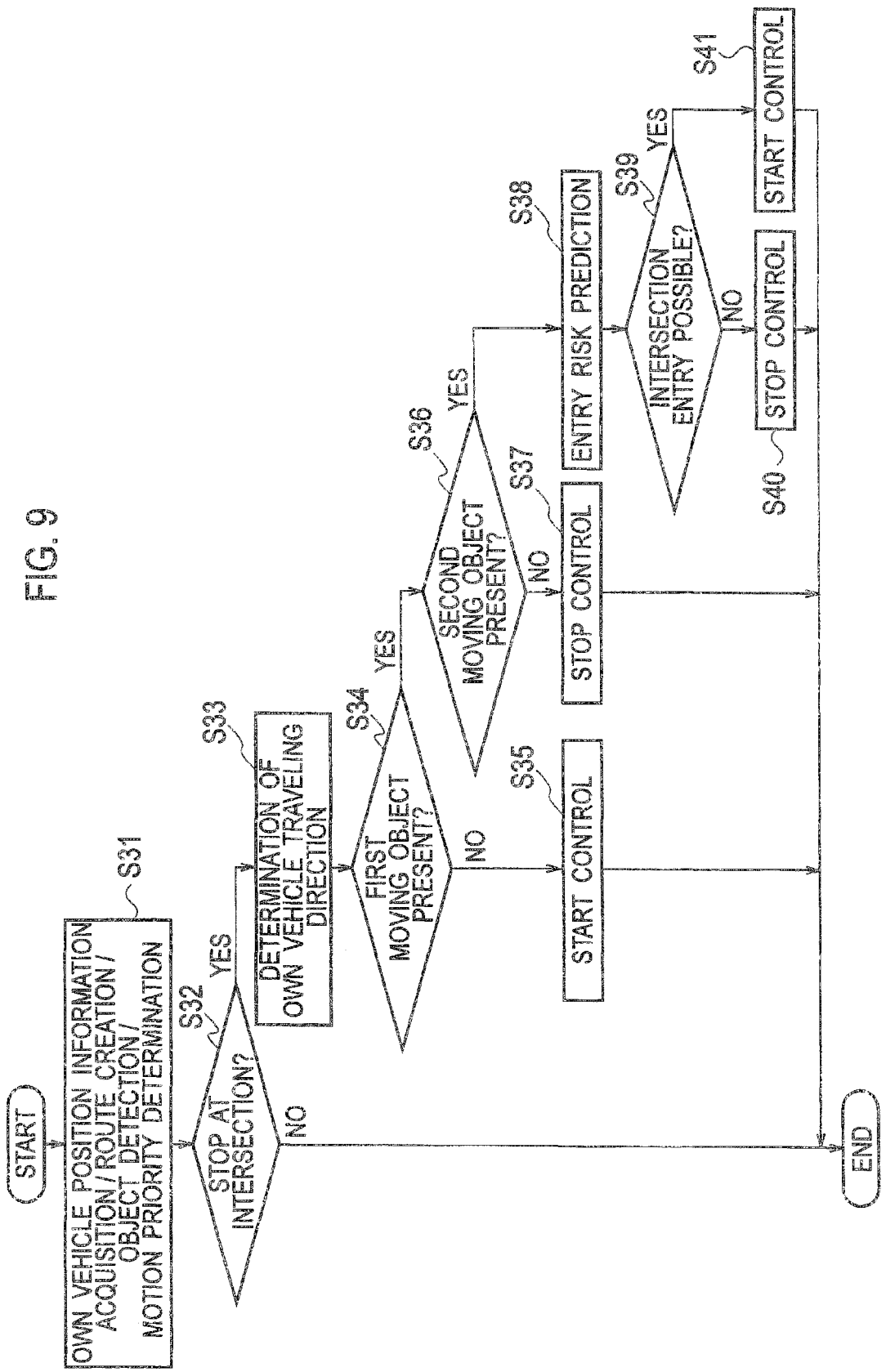
FIG. 9 is a flowchart showing an example of a driving assistance method for a vehicle using the driving assistance device for a vehicle shown in FIG. 8.

Next, an example of a driving assistance method for a vehicle using the driving assistance device for a vehicle shown in FIG. 8 is explained below with reference to FIG. 9. The respective steps S31 to S41 shown in FIG. 9 correspond to the respective steps S01 to S11 shown in FIG. 7, and the fundamental flow in the flowchart shown in FIG. 9 is the same as that in FIG. 7. The differences between FIG. 7 and FIG. 9 are explained below.

First, in step S31 including the acquisition of information of the own vehicle position and the detection of objects, the traveling route creating section 17 creates a traveling route of the own vehicle from a current position of the own vehicle on a map detected by the own vehicle position detection section 11 to a destination. The actuator 34 controls steering and braking-driving operations of the own vehicle based on the created traveling route in accordance with the control by the microcomputer 26. The motion priority determination section 32 determines the motion priority of the objects detected. Note that the traveling route is updated not constantly but when a road different from the traveling route is selected due to, for example, an overriding operation performed by the driver and when the traveling route cannot be physically followed because of construction or traffic restrictions.

Since the autonomous driving is controlled under the traffic rules programmed in the map data, the operation of stopping the own vehicle is determined in accordance with the traffic rules in step S32. Alternatively, the operation of stopping the own vehicle may be determined in accordance with the overriding operation.

In step S33, the traveling direction of the own vehicle is determined based on the traveling route created in step S31.

When a plurality of second moving objects are extracted with respect to one first moving object in step S36, an entry risk of the own vehicle is predicted, in step S38, based on the motion information of the second moving object having the highest motion priority determined in step S31. Namely, the determination of which second moving object has the highest motion priority under the traffic rules is used preferentially, while the attribute determination result obtained in step S31 is considered. When the motion priority of the plural second moving objects is equivalent, the determination result of a higher entry risk is preferentially used, as in the case of the first embodiment. In particular, the determination whether to enter the intersection may be made based on the second moving object having the highest collision risk among the plural second moving objects having the equivalent motion priority.

In step S37 and step S40, the actuator 34 keeps stop control. In step S35 and step S41, the actuator 34 switches from the stop control to start control. Alternatively, in view of safety, the actuator 34 may switch to the start control when receiving instructions to enter the intersection from the driver after notifying the driver that the own vehicle can enter the intersection. For example, the voice output section 30 may first provide voice notification to notify the driver that the own vehicle can enter the intersection and then switch from the stop control to the start control only after detecting the operation by the driver such as steering operation, acceleration operation or button steering operation. Here, since the constant overriding operation by the driver is possible in the second embodiment, the own vehicle can be stopped once the braking operation by the driver is detected even when the stop control is switched to the start control.

As described above, the second embodiment of the present invention can ensure the same working effects as those in the first embodiment and further ensure the following working effects.

When a plurality of second moving objects are extracted with respect to one first moving object, the intersection entry determination section 16 predicts a risk of collision with the first moving object based on the motion information of the second moving object crossing the intersection and having the highest motion priority. When the collision risk is less than a predetermined threshold, the intersection entry determination section 16 determines that the own vehicle can enter the intersection. For example, the information about the second moving object of which the motion priority under traffic rules is the highest, such as a pedestrian, is preferentially used so that the entry determination can be made with high reliability.

The first moving object extraction section 14 determines the traveling direction of the own vehicle at the intersection based on the traveling route created by the traveling route creating section 17. Accordingly, the traveling direction of the own vehicle can be determined accurately.

The actuator 34 serving as a vehicle controlling section performs the follow-up control based on the traveling route created by the traveling route creating section 17 in accordance with the determination result obtained by the intersection entry determination section 16. Thus, the safety vehicle control can be kept until the own vehicle reaches a destination based on the entry determination with high reliability by the intersection entry determination section 16.

Although the present invention has been described above by reference to the embodiments, the present invention is not limited to the descriptions thereof, and it will be apparent to those skilled in the art that various modifications and improvements can be made.

REFERENCE SIGNS LIST

11 OWN VEHICLE POSITION DETECTION SECTION
12 OBJECT DETECTION SECTION
13 INTERSECTION DETERMINATION SECTION
14 FIRST MOVING OBJECT EXTRACTION SECTION
15 SECOND MOVING OBJECT EXTRACTION SECTION
16 INTERSECTION ENTRY DETERMINATION SECTION
17 TRAVELING ROUTE CREATING SECTION
22 CAMERA (OBJECT DETECTION SECTION)
23 LASER RANGE FINDER (OBJECT DETECTION SECTION)
26 MICROCOMPUTER (DETERMINATION SECTION)
31 OBJECT RECOGNITION SECTION (OBJECT DETECTION SECTION)
32 MOTION PRIORITY DETERMINATION SECTION
34 ACTUATOR (VEHICLE CONTROLLING SECTION)
L DISTANCE
V01 OWN VEHICLE

The invention claimed is:

1. A driving assistance device for a vehicle comprising:
an own vehicle position detector for detecting a current position of an own vehicle on a map;
an object detector for detecting objects present on a periphery of the own vehicle;
an intersection determination circuit for determining whether the own vehicle is located within a predetermined region from an intersection without traffic light where two or more roads intersect based on the current position detected by the own vehicle position detector;
a first moving object extraction circuit for determining a traveling direction of the own vehicle and extracting, from the objects detected by the object detector, a first moving object which may come into collision with the own vehicle as the own vehicle enters the intersection when the intersection determination circuit determines that the own vehicle is located within the predetermined region from the intersection;
a second moving object extraction circuit for extracting, from the objects detected by the object detector, a second moving object crossing a road on which the first moving object is traveling between the own vehicle and the first moving object when the first moving object is extracted by the first moving object extraction circuit, and acquiring motion information of the second moving object crossing the intersection; and an intersection entry determination circuit for determining that the own vehicle can enter the intersection when the motion information of the second moving object crossing the intersection is acquired.

2. The driving assistance device for a vehicle according to claim 1, wherein:

the motion information of the second moving object crossing the intersection includes a length of time for which the second moving object is crossing the road on which the first moving object is traveling and a speed at which the second moving object is crossing the road;

when the first moving object belongs on a priority road at the intersection, the intersection entry determination circuit predicts that a risk of collision with the first moving object is lower as the length of time for which the second moving object is crossing the road on which the first moving object is traveling is longer or as the speed at which the second moving object is crossing the road is less; and the intersection entry determination circuit determines that the own vehicle can enter the intersection when the predicted collision risk is less than a predetermined threshold.

3. The driving assistance device for a vehicle according to claim 1, wherein:

the motion information of the second moving object crossing the intersection includes a length of time for which the second moving object is crossing the road on which the first moving object is traveling and a speed at which the second moving object is crossing the road;

when the first moving object belongs on a non-priority road at the intersection, the intersection entry determination circuit predicts that a risk of collision with the first moving object is lower as the length of time for which the second moving object is crossing the road on which the first moving object is traveling is shorter or as the speed at which the second moving object is crossing the road is greater; and the intersection entry determination circuit determines that the own vehicle can enter the intersection when the predicted collision risk is less than a predetermined threshold.

4. The driving assistance device for a vehicle according to claim 1, wherein:

the motion information of the second moving object crossing the intersection includes a position at which the second moving object is crossing the road on which the first moving object is traveling;

the intersection entry determination circuit predicts that a risk of collision with the first moving object is lower as the position at which the second moving object is crossing the road on which the first moving object is traveling is closer to the first moving object; and the intersection entry determination circuit determines that the own vehicle can enter the intersection when the predicted collision risk is less than a predetermined threshold.

5. The driving assistance device for a vehicle according to claim 1, wherein:

the intersection entry determination circuit predicts a risk of collision with the first moving object based on the motion information of the second moving object crossing the intersection, and determines that the own vehicle can enter the intersection when the collision risk is less than a predetermined threshold; and when the first moving object extraction circuit extracts a plurality of first moving objects or the second moving object extraction circuit extracts a plurality of second moving objects with respect to one first moving object, the intersection entry determination circuit determines that the own vehicle can enter the intersection when a highest collision risk is less than the predetermined threshold.

6. The driving assistance device for a vehicle according to claim 1, wherein:

the object detector includes a motion priority determination circuit for determining motion priority of a detected object defined depending on an attribute of the object; and when the second moving object extraction circuit extracts a plurality of second moving objects with respect to one first moving object, the intersection entry determination circuit predicts a risk of collision with the first moving object based on the motion information of a second moving object crossing the intersection and having a highest motion priority, and determines that the own vehicle can enter the intersection when the collision risk is less than a predetermined threshold.

7. The driving assistance device for a vehicle according to claim 1, wherein the first moving object extraction circuit extracts the first moving object based on the traveling direction of the own vehicle at the intersection.

8. The driving assistance device for a vehicle according to claim 7, wherein the first moving object extraction circuit determines the traveling direction of the own vehicle based on a signal of directional indication operated by a driver of the own vehicle.

9. The driving assistance device for a vehicle according to claim 7, further comprising a driving route creating circuit for creating a traveling route of the own vehicle from the current position of the own vehicle on the map detected by the own vehicle position detector to a destination, wherein the first moving object extraction circuit determines the traveling direction of the own vehicle based on the traveling route created by the traveling route creating circuit.

10. The driving assistance device for a vehicle according to claim 9, further comprising a vehicle controller for performing follow-up control based on the traveling route created by the traveling route creating circuit, wherein the vehicle controller performs vehicle control to follow the traveling route created by the traveling route creating circuit in accordance with a determination result of the intersection entry determination circuit.

11. A driving assistance method for a vehicle using a driving assistance device for a vehicle including an own vehicle position detector for detecting a current position of an own vehicle on a map, an object detector for detecting objects present on a periphery of the own vehicle, and a determination circuit for determining whether the own vehicle can enter an intersection based on the current position and the objects detected, the method performed by the determination circuit comprising:

determining whether the own vehicle is located within a predetermined region from the intersection without traffic light where two or more roads intersect based on the current position detected by the own vehicle position detector;

determining a traveling direction of the own vehicle;

extracting, from the detected objects, a first moving object which may come into collision with the own vehicle as the own vehicle enters the intersection when determining that the own vehicle is located within the predetermined region from the intersection;

extracting, from the detected objects, a second moving object crossing a road on which the first moving object is traveling between the own vehicle and the first moving object when extracting the first moving object;

acquiring motion information of the second moving object crossing the intersection when extracting the second moving object; and determining that the own vehicle can enter the intersection when acquiring the motion information of the second moving object crossing the intersection.

\* \* \* \* \*